(12) United States Patent
Katagiri

(10) Patent No.: US 6,352,246 B2
(45) Date of Patent: Mar. 5, 2002

(54) LIQUID FILLED VIBRATION ISOLATOR

(75) Inventor: Katuhiko Katagiri, Ichinomiya (JP)

(73) Assignee: Tokai Rubber Industries, Ltd., Komaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,995

(22) Filed: Jul. 28, 1999

(30) Foreign Application Priority Data

| Jul. 29, 1998 | (JP) | 10-213892 |
| Jul. 12, 1999 | (JP) | 11-197357 |

(51) Int. Cl.[7] .............................. F16F 5/00; F16M 5/00
(52) U.S. Cl. .................................. 267/140.11; 267/120
(58) Field of Search ....................... 267/140.11, 140.12, 267/120, 122

(56) References Cited

U.S. PATENT DOCUMENTS

| 5,139,241 A | * | 8/1992 | Hamaekers | 267/140.12 |
| 5,370,376 A | * | 12/1994 | Ishiyama | 267/140.12 |
| 5,887,844 A | * | 3/1999 | Fujiwara | 248/562 |
| 6,015,141 A | * | 1/2000 | Rudolf | 267/140.12 |
| 6,102,380 A | * | 8/2000 | Tsutsumida | 267/140.12 |

FOREIGN PATENT DOCUMENTS

| JP | 02026337 | * | 1/1990 |
| JP | 02159438 | * | 6/1990 |
| JP | 06074287 | * | 3/1994 |

* cited by examiner

Primary Examiner—J. J. Swann
Assistant Examiner—David Divine
(74) Attorney, Agent, or Firm—Oblon, Spivak, McClelland, Maier & Neustadt, P.C.

(57) ABSTRACT

A liquid filled vibration isolator incorporates an inner cylindrical metal member 10, an intermediate metal member 20 coaxially disposed on the outside of the inner cylindrical metal member and at a position apart from the inner cylindrical metal member, having paired ring portions 21 at two ends in the axial direction and a connection portion 25 structured to integrally connect the ring portions 21 to each other and having an opening 26 formed in a direction in which main vibrations are input; and a rubber member 30 structured to connect the intermediate metal member and the inner cylindrical metal member 10 to each other and incorporating a recess 33 corresponding to the opening 26. A passage forming member 40 for covering the opening 26 on the outer surface of the connection portion 25 has a circular-arc plate 41 extending in the circumferential direction, at least one partition wall 42 extending from either end of the circular-arc plate in the circumferential direction except for the two ends of the circular-arc plate in the widthwise direction and end walls 43 stood erect at two ends of the circular-arc plate in the circumferential direction so that a reciprocative passage groove 44 is formed. Moreover, an air discharge opening 47 which penetrates the partition wall 42 in the radial direction is provided for a portion of the partition wall.

17 Claims, 9 Drawing Sheets

PRIOR ART

LIQUID FILLED VIBRATION ISOLATOR

BACKGROUND OF THE INVENTION

The present invention relates to a liquid filled vibration isolator for use in, for example, an engine mount of a car body.

Hitherto, a liquid filled vibration isolator of the above-described type has been configured, for example, as shown in FIGS. 12 to 14. The liquid filled vibration isolator includes an inner cylindrical metal member 1 and a cylindrical intermediate metal member 2. The intermediate metal member 2 is disposed around the inner cylindrical metal member 1 at a distance spaced apart from the inner cylindrical metal member 1. The inner cylindrical metal member 1 and the cylindrical intermediate metal member 2 are coaxially disposed. The cylindrical intermediate metal member 2 has a pair of ring portions 2a, disposed at the two axial ends of the cylindrical intermediate metal member 2, and a connecting portion 2b for integrally connecting the ring portions 2a to each other. The connecting portion 2b has a cross section formed in a circular-arc-like shape, the cross section being a cross section in a direction perpendicular to the radial connecting portion 2b axis. The diameter of the connection portion 2b is smaller than the diameter each of the ring portions 2a. The connection portion 2b has one opening 2c formed in a direction in which main vibrations are input. A cylindrical rubber member includes a pair of side walls 3a for connecting the two axial directional ends of the cylindrical intermediate metal member 2 and the inner cylindrical metal member 1 to one another. Moreover, the rubber member includes an arm portion 3b extending between the side walls 3a at a position on the inside of the connection portion 2b in the axial direction. Thus, the arm portion 3b connects the connection portion 2b and the inner cylindrical metal member 1 to each other. The rubber member has a thin diaphragm portion 3c disposed on the outside of the connection portion 2b such that a gap 3d is created between the connection portion 2b and the thin diaphragm portion 3c. The diaphragm portion 3c extends between two opposite side portions in the axial direction of the liquid filled vibration isolator. In addition, the rubber member has a recess 3e surrounded by the pair of side walls 3a and the arm portion 3b and the recess 3e is opened in the opening 2c. A passage forming member 4 joins the pair of ring portions 2a. The passage forming member 4 closes the opening 2c in the connection portion 2b and has a shape extending on the two sides in the circumferential direction.

As shown in FIG. 15A, the passage forming member 4 includes a circular-arc plate 4a having a width slightly larger than the opening 2c in a part of the connection portion 2b. Moreover, a plurality of partition walls 4b are disposed on the outside of the circular-arc plate 4a at positions between the two sides thereof (the two sides included) in the width-wise direction such that the distances between the partition walls 4b are substantially the same and the partition walls 4b alternately extend from each of the two ends of the circular-arc plate in the circumferential direction. Moreover, end walls 4c stand erect at the two ends of the circular-arc plate 4a in the circumferential direction. Thus, a reciprocative passage 4d is formed. The reciprocative passage 4d reciprocates between the two ends of the circular-arc plate 4a in the circumferential direction. Referring to FIG. 15A, a first communication opening 5a, which is allowed to communicate with the recess 3e, is formed at a first end of the reciprocative passage and a second communication opening 5b, which is allowed to communicate with the gap 3d, is formed at a second end of the reciprocative passage 4d. As shown in FIG. 13, an upper stopper member 6a, made of rubber to have elasticity, is molded on the reverse side of the passage forming member 4 by vulcanization. A lower stopper member 6b is disposed on the inside of the upper stopper member 6a an is made of resin.

An outer cylindrical metal member 7, which includes a rubber seal 7a on the inner surface thereof, is coaxially disposed on the outside of the cylindrical intermediate metal member 2. The outer cylindrical metal member 7 is being secured to the cylindrical intermediate metal member 2 via drawing process. The outer cylindrical metal member 7 closes the space from the cylindrical intermediate metal member 2 in a fluid-tight manner so that a main liquid chamber 8a is formed in the recess and a sub-liquid-chamber 8b is formed in the gap 3d. In addition, an orifice passage 8c is formed in a space within the passage forming member 4 to allow the main liquid chamber 8a and the sub-liquid-chamber 8b to communicate with each other.

When in use, the inner cylindrical metal member 1 of the liquid filled vibration isolator is connected to a support member (not shown) of a car body and the outer cylindrical metal member 7 is connected to a support member (not shown) adjacent to the engine of the car. The upper and lower stopper members 6a, 6b are disposed in the vertical direction (i.e., the direction in which the main vibrations of the engine are input). In addition, the main liquid chamber 8a and the sub-liquid-chamber 8b are disposed in the vertical direction across the inner cylindrical metal member 1. If vibrations are produced between the inner cylindrical metal member 1 and the outer cylindrical metal member 7, the elastic action of the rubber member and the resonant action of the liquid column (i.e., via liquid which flows in the orifice passage 8c) damp the vibrations.

Since the passage forming member 4 of the liquid filled vibration isolator is made of metal, such as an aluminum die-cast, a problem arises in that the weight of the liquid filled vibration isolator becomes heavier as the absolute length of the orifice passage is elongated. The passage forming member 4, joined to the cylindrical intermediate metal member 2, is immersed in a liquid to fill the inside portion of the recess 3e and similar the liquid. Then, the outer cylindrical metal member 7, disposed on the outer surface of the cylindrical intermediate metal member 22 is subjected to the drawing process in the liquid. Since only one opening (i.e., the communication opening) of the passage forming member 4, which is allowed to communicate with the recess 3e, is provided, air in the main liquid chamber 8a cannot easily be discharged. Thus, a long time is required to complete the liquid filling operation. Another problem arises in that residual air in the main liquid chamber 8a deteriorates the performance for isolating vibrations.

SUMMARY OF THE INVENTION

To overcome the foregoing above-described problems, an object of the present invention is to provide a liquid filled vibration isolator which can easily and reliably be filled with liquid and which enables the weight of a passage forming member thereof to be reduced.

To achieve the foregoing object, according to one aspect of the present invention, a liquid filled vibration isolator comprising: an inner cylindrical metal member; a cylindrical intermediate metal member disposed on the outside of the inner cylindrical metal member at a position apart from the inner cylindrical metal member and incorporating paired ring portions formed at two ends in the axial direction, a connection portion for integrally connecting the paired ring portions to each other and an opening formed in a direction in which main vibrations are input; a rubber member constituted by paired side wall portions for connecting the paired ring portions of the intermediate metal member and the inner cylindrical metal member to each other, an arm portion for connecting the paired side wall portions in an axial direction to connect the connection portion and the inner cylindrical metal member, a recess surrounded by the paired side wall portions and the arm portion and opened in the opening, a thin diaphragm portion disposed opposite to the opening in a radial direction such that the thin diaphragm portion is disposed apart from the inner cylindrical metal member and the arm portion at a position between the paired ring portions of the intermediate metal member, and a rubber sealing portion disposed on the outer surface of the cylindrical intermediate metal member; a passage forming member incorporating a circular-arc plate disposed on the outside of the connection portion and extending in the circumferential direction to close the opening, a reciprocative passage groove formed in the outer surface of the circular arc plate to reciprocate between two ends in the circumferential direction, a first communication opening allowed to communicate with the recess at one end of the reciprocative passage groove and a second communication opening opened in the circumferential direction at another end of the reciprocative passage groove; and an outer cylindrical metal member secured to the outside portion of the cylindrical intermediate metal member and the passage forming member, arranged to cause the sealing portion to close a space from the cylindrical intermediate metal member in a liquid-tight manner to form a main liquid chamber in the recess; and a sub-liquid-chamber defined by the diaphragm portion and capable of forming an orifice passage in a space from the passage forming member to allow the main liquid chamber and the sub-liquid chamber to communicate with each other, wherein the reciprocative passage groove, which is formed into the orifice passage, is formed by at least one partition wall extending from either end of the circular-arc plate in the circumferential direction, except for the two ends of the circular-arc plate in the widthwise direction and end walls standing erect at two ends of the circular-arc plate in the circumferential direction. When a plurality of the partition walls, are provided, the partition walls disposed at substantially the same distances in the widthwise direction, are alternately extended from the two ends of the circular-arc plate in the circumferential direction, except for the two ends of the circular-arc plate in the widthwise direction.

In the present invention configured as described above, no partition wall is disposed at the two ends of the passage forming member in the widthwise direction. But in the passage forming member having no partition wall at its widthwise ends a passage can be formed between the other partition wall on the inside in the widthwise direction and the inside portions of the ring portion of the cylindrical intermediate metal member in the axial direction. Therefore, both a long passage, having an appropriate width, and the vibration isolating function, of the orifice passage of the liquid filled vibration isolator, can be maintained. Moreover ,since no partition wall is disposed at the two ends in the axial direction, the weight and manufacturing cost of the passage forming member can be reduced.

An air discharging opening, which penetrates the partition wall in the radial direction and which is allowed to communicate with the recess, may be provided for a portion of the partition wall. Since the air discharging opening is formed in a portion of the partition wall of the passage forming member, removal of a bubble in the main liquid chamber can easily and reliably be performed through the air discharging opening when an operation for filling the recess with liquid is performed. Since the air discharging opening is provided for a portion of the partition wall, the width of the passage (i.e., formed, as described above, between the partition on the inside of the widthwise direction and the inside portion of the ring portions of the cylindrical intermediate metal member in the axial direction), of the passage forming member, is reduced in the foregoing portion of the partition wall. However, omission of the partition wall at the two ends of the passage forming member in the widthwise direction enables preventing a reduction in the width of the passage.

A configuration may be employed in which a projection, projecting outwardly in the radial direction, is provided for a portion of the reciprocative passage groove, and an air discharging opening, which penetrates the projection in the radial direction and which is allowed to communicate with the recess, is provided for the projection. Since the air discharging opening is formed in the projection provided for a portion of the reciprocative passage of the passage forming member, removal of a bubble in the main liquid chamber can easily and reliably be performed through the air discharging opening when an operation for filling the recess with liquid is performed. Since the projection is provided for a portion of the reciprocative passage, the width of the passage (i.e., formed, as described above, between the partition on the inside of the widthwise direction and the inside portion of the ring portions of the cylindrical intermediate metal member in the axial direction), of the passage forming member, is reduced in the foregoing portion. However, omission of the partition wall at the two ends of the passage forming member in the widthwise direction enables preventing a reduction in the-width of the passage.

A passage forming recess, which is allowed to communicate with the reciprocative passage groove, may be provided for a portion of the cylindrical intermediate metal member opposite to the air discharging opening in the axial direction. Therefore, either the air discharging opening, provided for a portion of the partition wall, or the projection causes the width of the passage (i.e., formed, as described above, between the partition on the inside of the widthwise direction and the inside portion of the ring portions of the cylindrical intermediate metal member in the axial direction), of the passage forming member, to be reduced. However the passage forming recess, provided for the corresponding position of the cylindrical intermediate metal member, enables the width of the reciprocative passage in the narrowed portion to be enlarged relatively.

DETAILED DESCRIPTION OF THE PREFERRED EMBODIMENT

Figure 1:
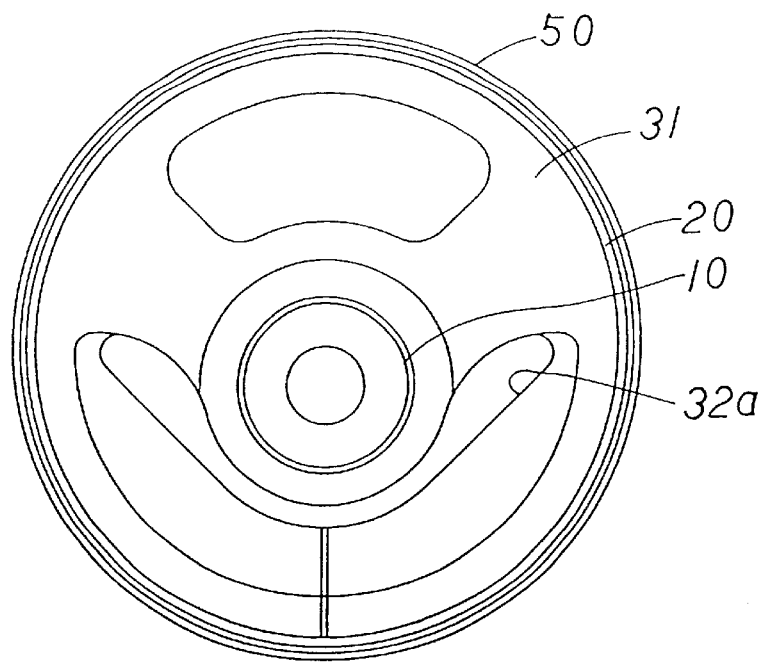
FIG. 1 is a side view schematically showing a liquid filled vibration isolator according to an embodiment of the present invention.

An embodiment of the present invention will now be described with reference to the drawings. FIGS. 1 to 4 are a side view, a partially-broken plan view, a cross sectional view in an axial direction, and a cross sectional view in a direction perpendicular to the axial direction, respectively each showing a liquid filled vibration isolator according to the present invention.

The liquid filled vibration isolator incorporates an inner cylindrical metal member 10. The inner cylindrical metal member 10 is a pipe-shaped metal member. A cylindrical intermediate metal member 20 is coaxially disposed around the inner cylindrical member 10 at a position apart from the inner cylindrical member 10. The intermediate member 20 has paired ring portions 21 and a connection portion 25 for connecting the ring portions 21 to each other. A cylindrical rubber member 30 is disposed so at to integrally connect the intermediate member 20 and the inner cylindrical member 10 to each other. A passage forming member 40 closes the opening 26 of the connection portion 25 and extends in the circumferential direction. A outer cylindrical metal member 50 is secured to the outside portions of both the intermediate member 20 and the passage forming member 40 through a sealing member 51 in a liquid-tight manner. The outer cylindrical member 50 forms an orifice passage K3 in a space from the passage forming member 40 and a main liquid chamber K1 and a sub-liquid-chamber K2 which are allowed to communicate with each other through the orifice passage K3.

Figure 2:
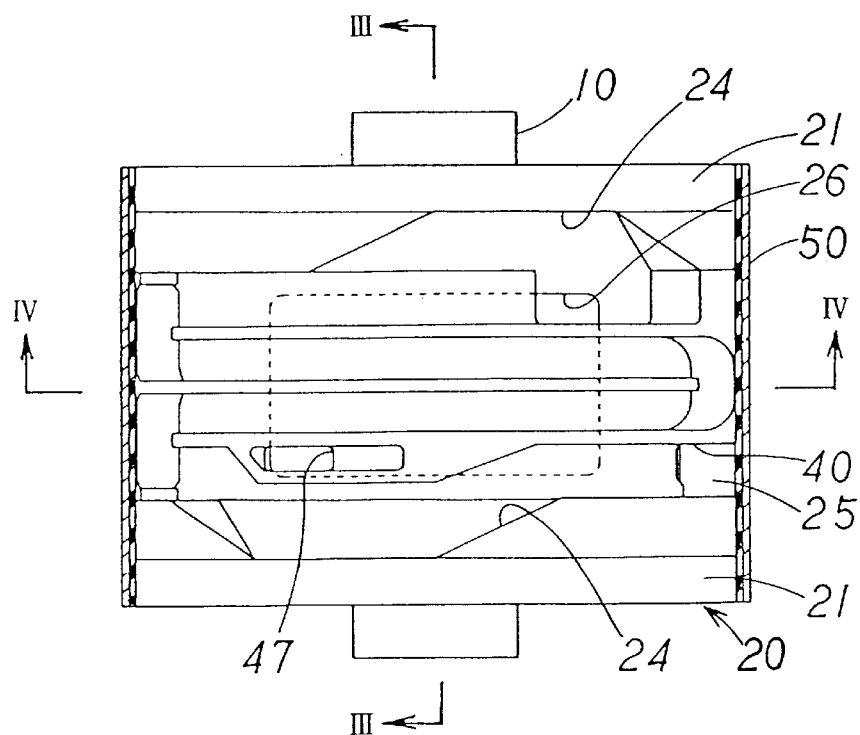
FIG. 2 is a plan view showing a state of the liquid filled vibration isolator in which a portion of an outer cylindrical metal member has been removed.
Figure 6:
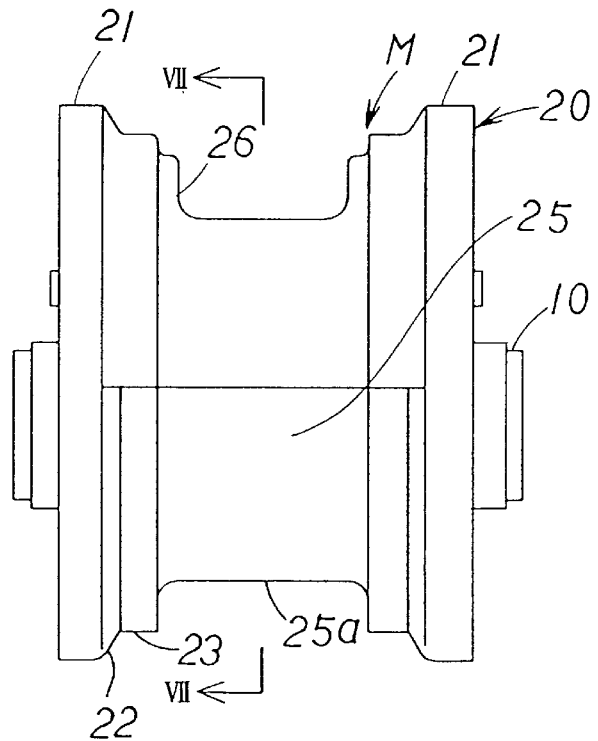
FIG. 6 is a front view showing the rubber product M obtained by vulcanization.

As shown in FIG. 6, each of the ring portions 21 of the intermediate member 20 is configured to have an inclined portion 22 so that a substantially inner half portion, in the axial direction, of a substantially half portion (i.e., a lower half portion in the drawing) in the circumferential direction, is formed into a small-diameter portion 23. The small diameter portion 23 has a reduced diameter as compared with the outer half portion in the axial direction. As shown in FIG. 2, passage forming recesses 24 are formed in a portion of the ring portions 21 located opposite to the small-diameter portion 23 in the radial direction. The passage forming recesses 24 are formed at positions so as to interpose an opening 26 of the connection portion 25 (described in more detail below). Each of the passage forming recesses 24 has a shape such that a substantially inner half portion in the axial direction is recessed into a trapezoidal shape, when viewed in plan view.

Figure 7:
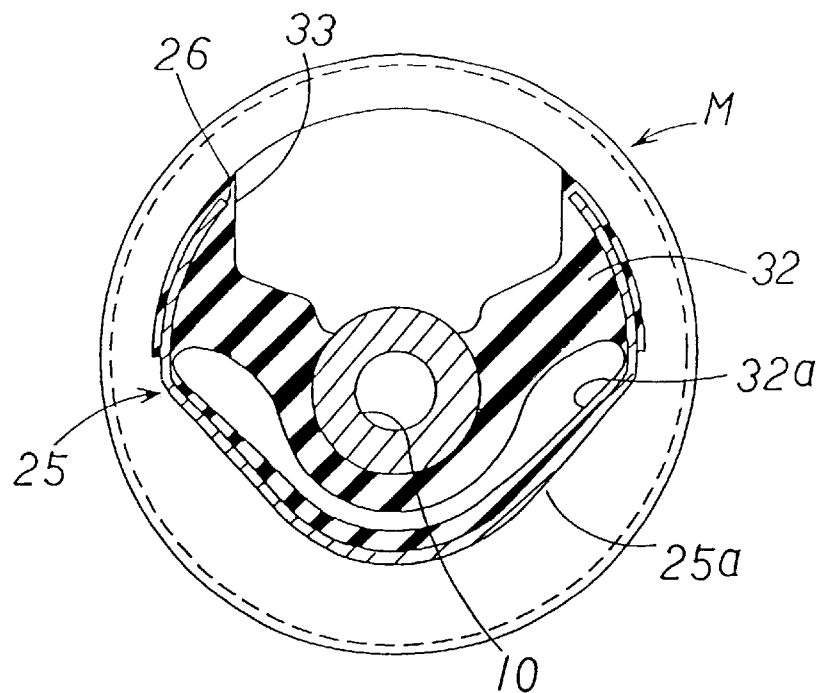
FIG. 7 is a cross sectional view taken along line VII—VII shown in FIG. 6.
Figure 8:
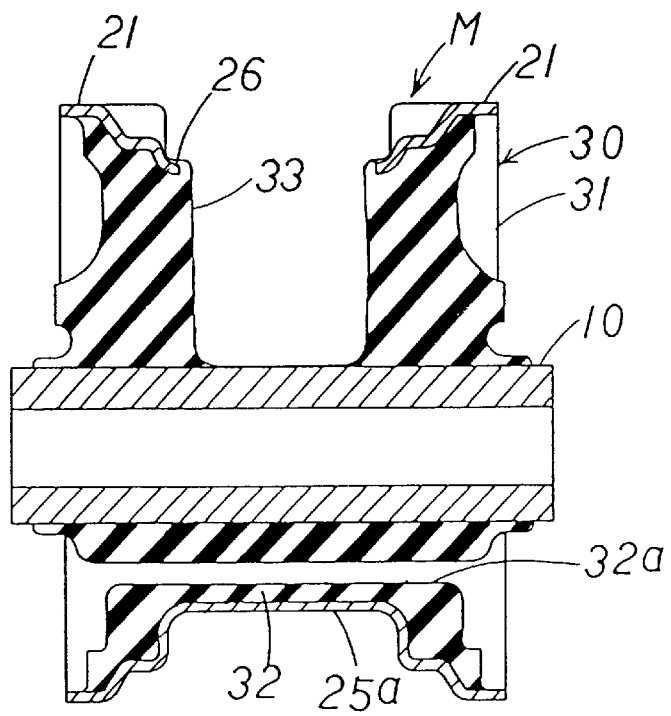
FIG. 8 is a cross sectional view taken along line VIII—VIII shown in FIG. 5.

The connection portion 25, for connecting the ring portions 21 to each other, has a diameter which is smaller than the diameter of the small-diameter portion 23. As shown in FIG. 7, an axial directional portion of the connection portion 25, corresponding to the small-diameter portion 23, is recessed into a V-shaped portion 25a having a substantially V-shaped cross section in a direction perpendicular to the axis. A rectangular opening 26, when viewed in plan view, is formed in the central portion, of a portion having a circular-arc cross sectional shape, in a direction perpendicular to the axial direction, located opposite to the V-shaped portion 25a in the radial direction. The axial direction of the opening 26 extends to positions adjacent to the two ends of the connection portion 25. The length of the opening 26 in the circumferential direction is about ⅙ of the length of the circumferential length.

The rubber member 30 has paired side walls 31 which connect the substantially axial-directional overall surfaces of a portion of the ring portions 21, and the connection portion 25, and the inner cylindrical member 10 to each other. Each of the paired side walls 31 has a large thickness. An arm portion 32, extending in the axial direction and arranged to connect the connection portion 25 and the inner cylindrical member 10 to each other, is formed between the paired side walls 31. The arm portion 32 is disposed in the intermediate member 20 and has a V-shaped gap portion 32a, which is formed between the inner cylindrical member 10 and the V-shaped portion 25a at a position adjacent to the V-shaped portion 25a. The V-shaped gap portion 32a penetrates in the axial direction and also penetrates the side walls 31. A recess 33 is formed in the connection portion so as to be surrounded by the two side walls 31 and the arm portion 32. The recess 33 opens opposite to the opening 26.

The rubber member 30 is integrally molded as a rubber product M made of rubber, which is an intermediate product including the inner cylindrical member 10 and the intermediate member 20 as shown in FIGS. 5 to 8, by performing vulcanization in a state in which the inner cylindrical member 10 and the intermediate member 20 are placed in a mold (not shown).

Figure 3:
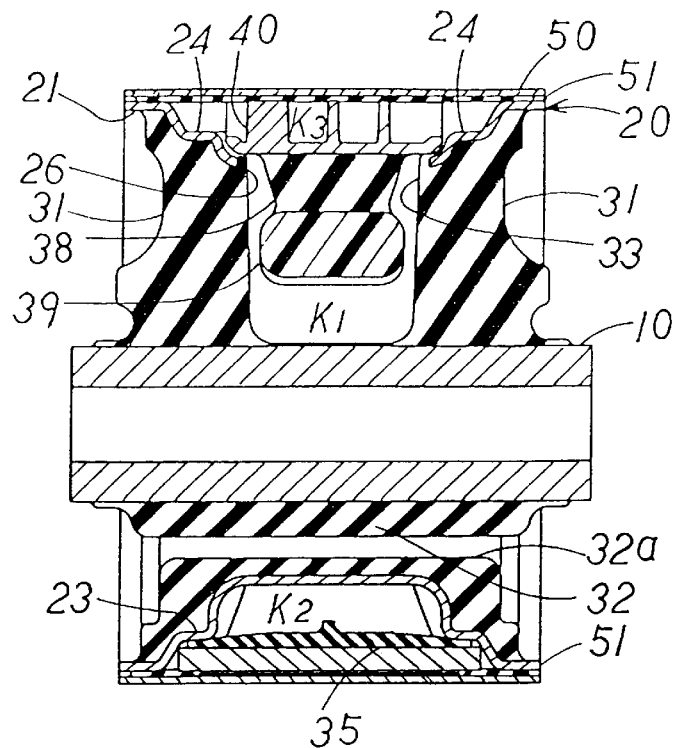
FIG. 3 is a cross sectional view taken along line III—III shown in FIG. 2.
Figure 4:
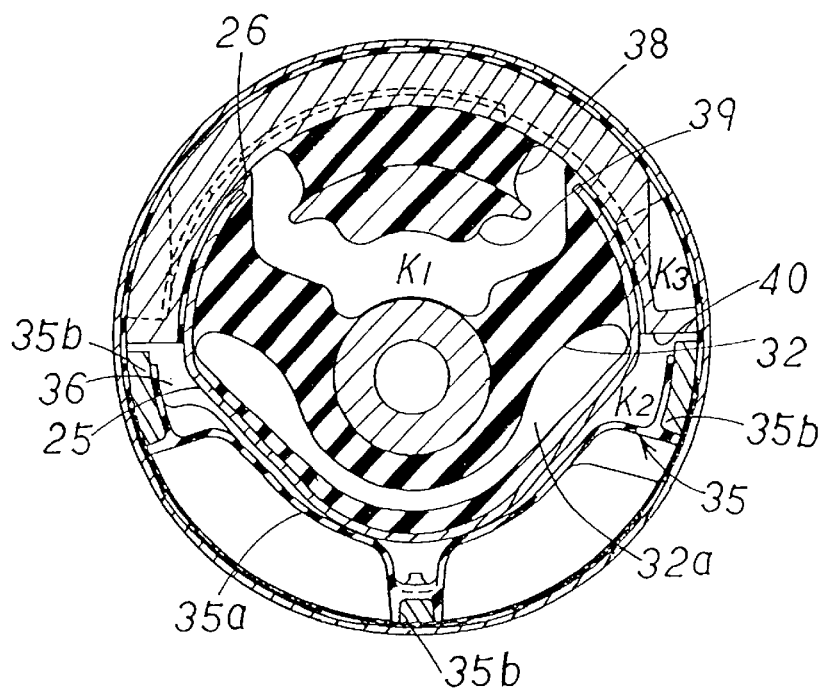
FIG. 4 is a cross sectional view taken along line IV—IV shown in FIG. 2.
Figure 5:
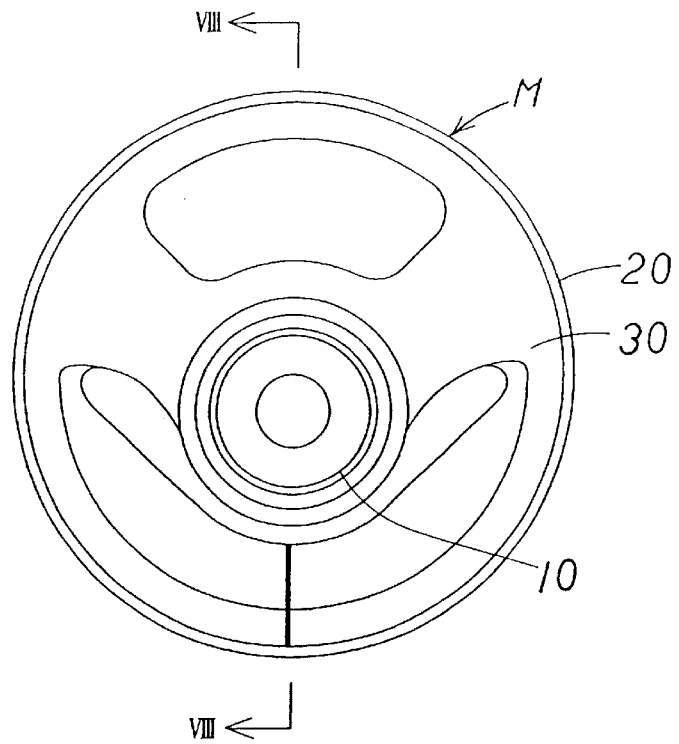
FIG. 5 is a side view showing a rubber product M, obtained by vulcanization and which is an intermediate element of the liquid filled vibration isolator.

As shown in FIGS. 2 to 4, a passage forming member 40 extends in the circumferential direction and closes the opening 26. The passage forming member 40 joined to the connection portion 25 of the intermediate member 20, which is provided for the rubber product M, made of vulcanized rubber. The passage forming member 40 is made of aluminum. As shown in FIG. 9, the passage forming member 40 includes an elongated circular-arc plate 41, which has a predetermined width and which is warped into a semicircular shape. A plurality (i.e., three in FIG. 9) partition walls 42 are provided for the outer surface of the circular-arc plate 41. The partition walls 42 are disposed at substantially the same spaced intervals except for the two axial directional ends. The partition walls 42 stand erect and alternately extend from the two ends in the circumferential direction to the positions adjacent to the other ends in the circumferential direction. End walls 43 stand erect at the two ends of the outer surface of the circular-arc plate 41 in the circumferential direction. Thus, the end walls 43 form a reciprocative passage groove 44, which is disposed to reciprocate in the circumferential direction of the circular-arc plate 41 together with the partition walls 42. The circular-arc plate 41 has a first communication opening 45, which is allowed to communicate with the recess 33 at a position adjacent to a first end of the reciprocative passage groove 44 and a second communication opening 46, opened in the circumferential direction at a position adjacent to a second end of the reciprocative passage groove 44 and allowed to communicate with a gap 36 (described in more detail below). The passage forming member 40 is integrally molded by using aluminum die-cast.

As shown in FIGS. 2 and 9, the partition wall 42, adjacent to a first end of the passage forming member 40 in the widthwise direction, has a large-width portion 42a having substantially the same width as that of the reciprocative passage groove 44. The large-width portion 42a has an air discharge opening 47 which penetrates the large-width portion 42a in the radial direction. A rubber stopper 38, in the form of a substantially rectangular thick plate, is integrally joined to the central position of the reverse side of the circular-arc plate 41 of the passage forming member 40 in the circumferential direction by vulcanization. The stopper 38 projects into the recess 33 of the rubber member 30. A resin stopper member 39, in the form of a thick plate, is bonded to the surface of the stopper 38 in the radial direction. The stopper member 39 has substantially the same shape as that of the stopper 38, when viewed in plan view. The cross sectional shape of the stopper member 39, in a direction perpendicular to the axial direction, is formed into a substantially circular arc shape.

A V-shaped diaphragm member 35 is secured to the V-shaped portion 25a of the connection portion 25 of the intermediate member 20 in the circumferential direction, as shown in FIGS. 3 and 4. The diaphragm member 35 incorporates a rubber diaphragm membrane 35a having a small thickness supported by the support portions 35b at the two ends and at the center in the circumferential direction. The diaphragm membrane 35a is secured to the small-diameter portion 23 by the three support portions 35b so that a gap 36 is created between the V-shaped portion 25a and the diaphragm membrane 35a. The outer cylindrical member 50 has an inner surface on which a rubber sealing member 51, having a small thickness, is formed by vulcanization.

The rubber product M, which is obtained by vulcanization and to which the passage forming member 40 and the diaphragm member 35 have been joined, and the outer cylindrical member 50, are immersed in a liquid chamber filled with the liquid. The. outer cylindrical member 50 is coaxially disposed around the rubber product M obtained by vulcanization. As a result, the inside portions of the recess 33 and the gap 36 are filled with the liquid. Moreover, the outer surface of the outer cylindrical member 50 is subjected to a drawing process. Thus, the outer cylindrical member 50 is secured to the outer surface of the rubber product M obtained by vulcanization. As a result, the liquid filled vibration isolator, according to this embodiment, can be manufactured. Hence, it follows that the opening of the recess 33 of the rubber member 30 is closed in a liquid-tight manner. This leads to the fact that the main liquid chamber K1, which is created, is filled with liquid. Moreover, the sub-liquid-chamber K2, having the gap 36 filled with liquid, is created. The reciprocative passage groove 44 of the passage forming member 40 is filled with the liquid so as to be formed into the orifice passage K3 for allowing the main liquid chamber K1 and the sub-liquid-chamber K2 to communicate with each other.

Note that the outer cylindrical member 50 is used as a joining metal member as it is. As an alternative to this, a cylindrical joining member is press-fit to the outer surface of the outer cylindrical member 50.

The passage forming member 40 has the air discharge opening 47 formed in a portion of the partition wall 42 in addition to the first communication opening 45. Therefore, air can be discharged from the two portions (i.e., the first communication opening 45 and the air discharge opening 47) when the liquid is enclosed during the operation for joining the rubber product M, obtained by vulcanization, and the outer cylindrical member 50 to each other. Therefore, removal of a bubble in the main liquid chamber K1 can easily and reliably be performed. Since the air discharge opening 47 is formed in a portion of the partition walls 42, the passage forming member 40 has a narrowed passage. Thus, no partition wall is disposed at each of the two ends of the passage forming member 40 in the widthwise direction, and the passage forming recess 24 is formed at the position opposite to the air discharge opening 47 of the intermediate member 20. Therefore, an appropriate width for the passage can be maintained. This leads to the fact that an appropriate width and sufficient length passage forming member 40 enables the passage to be maintained. Since no partition wall is provided for each of the two ends of the passage forming member 40 in the widthwise direction, the weight and cost of the passage forming member 40 can be reduced.

Figure 9A:
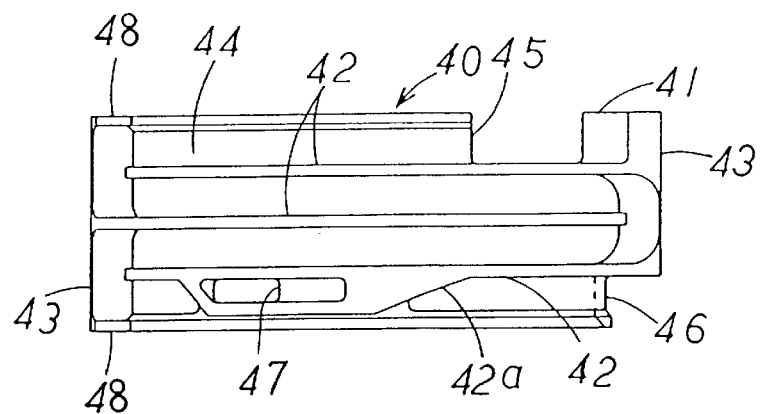
FIG. 9A is a plan view showing a passage forming member.
Figure 9B:
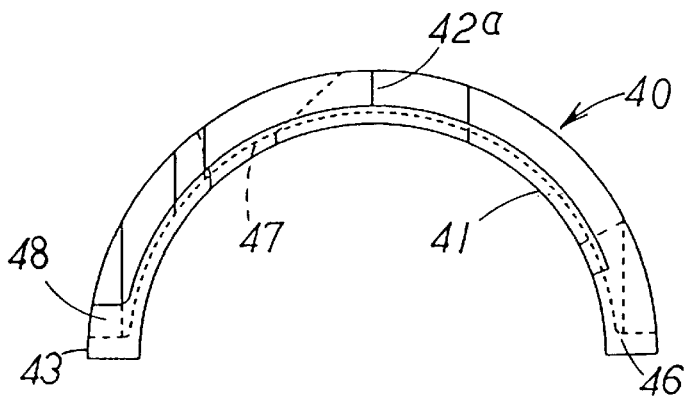
FIG. 9B is a front view showing the passage forming member.
Figure 9C:
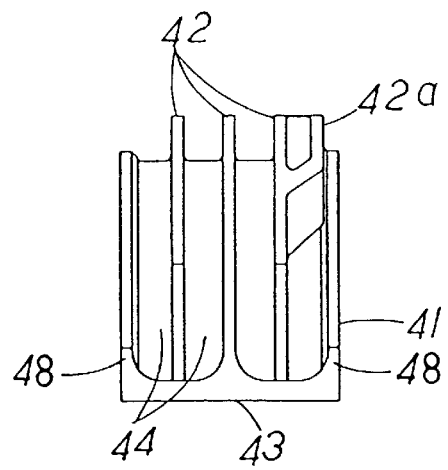
FIG. 9C is a side view showing the passage forming member.

As shown in FIGS. 9A to 9C, the passage forming member 40 has short-cut preventive walls 48 which stand erect at positions adjacent to one end of the circular-arc plate 41 in the circumferential direction and at the two ends of the circular-arc plate 41 in the widthwise direction. The short-cut preventive walls 48 project slightly in the circumferential direction at the two ends. The height of each of the short-cut preventive walls 48 is the same as that of each of the partition walls 42. Since the short-cut preventive walls 48 are stand erect a, a short-cut between an intermediate position of the orifice passage K3 of the passage forming member 40 and the sub-liquid-chamber K2 can reliably be prevented, even if the position where the passage forming member 40 is joined is slightly deviated in the circumferential direction. Note that the short-cut preventive walls 48 may be omitted from this configuration, as necessary.

The thusly-configured liquid filled vibration isolator is disposed such that the inner cylindrical member 10 is connected to, for example, a support member (not shown) of a car body. Moreover, the outer cylindrical member 50 is connected to a support member (not shown) in the engine portion. Moreover, the liquid filled vibration isolator is disposed such that the main liquid chamber K1 and the sub-liquid-chamber K2 are disposed on the upper portion and the lower portion in the vertical direction (i.e., the direction into which main vibrations of the engine are input). If vibrations are produced between the inner cylindrical member 10 and the outer cylindrical member 50, the elastic action of the rubber member 30 and the resonant action of the liquid column of the liquid, which flows in the orifice passage K3, damp the vibrations. If excessively intense vibrations are produced between the inner cylindrical member 10 and the outer cylindrical member 50, the lead end surface of the stopper member 39 is brought into contact with the outer surface of the inner cylindrical member 10. Therefore, displacement can be restrained to satisfy a predetermined range.

As described above, the liquid filled vibration isolator according to this embodiment is configured to that the passage forming member 40 has the air discharge opening 47. Therefore, the operation for enclosing the liquid can easily be performed. Since an orifice passage having an appropriate width is formed, an appropriate vibration isolating function can be maintained. Moreover, the weight and the manufacturing cost of the passage forming member 40 can be reduced.

Figure 10:
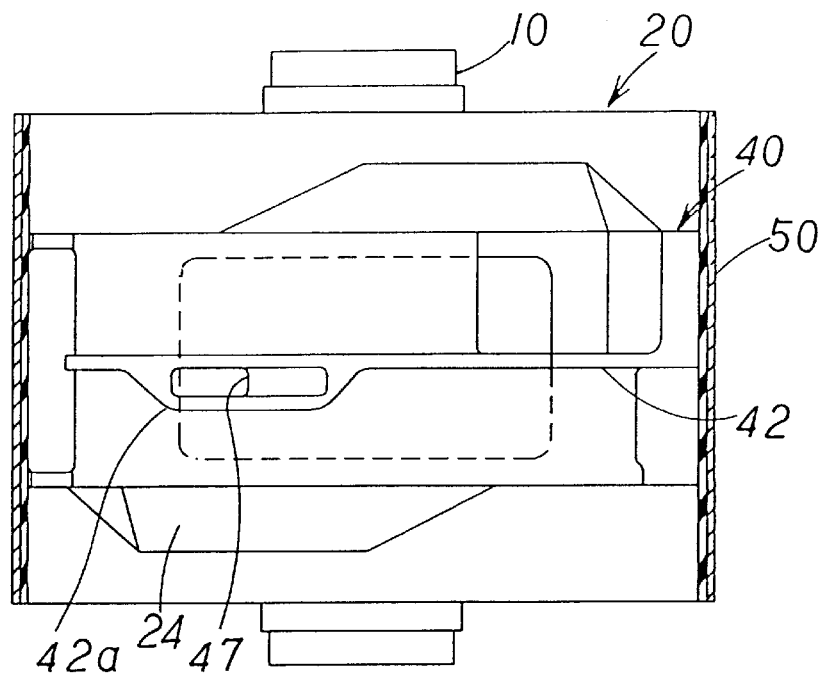
FIG. 10 is a plan view showing a state of the liquid filled vibration isolator, incorporating a passage forming member configured to reciprocate one time, in which a portion of the outer cylindrical metal member has been removed.

The passage forming member 40, according to this embodiment, has the configuration that the circular-arc plate 41 is provided with three partition walls 42 and, therefore, two reciprocative passages are formed. However, only one partition wall may be provided. When there is only one partition wall 42 as shown in FIG. 10, one reciprocative passage is formed. When two partition walls are provided, one and one-half reciprocative passages are formed.

A modification of the passage forming member will now be described.

Figure 11:
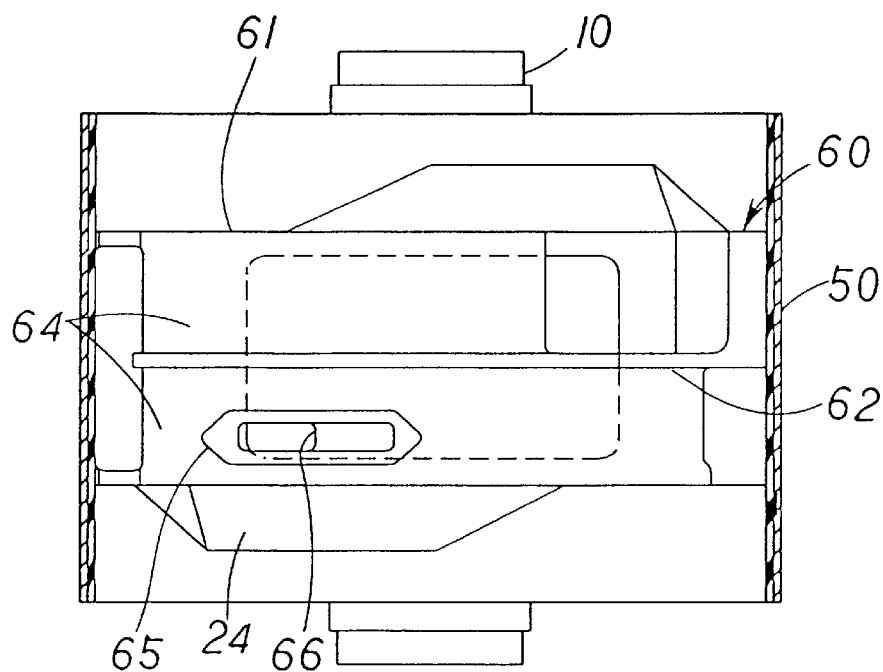
FIG. 11 is a plan view showing a state of a liquid filled vibration isolator according to a modification in which a portion of the outer cylindrical metal member has been removed.
Figure 12:
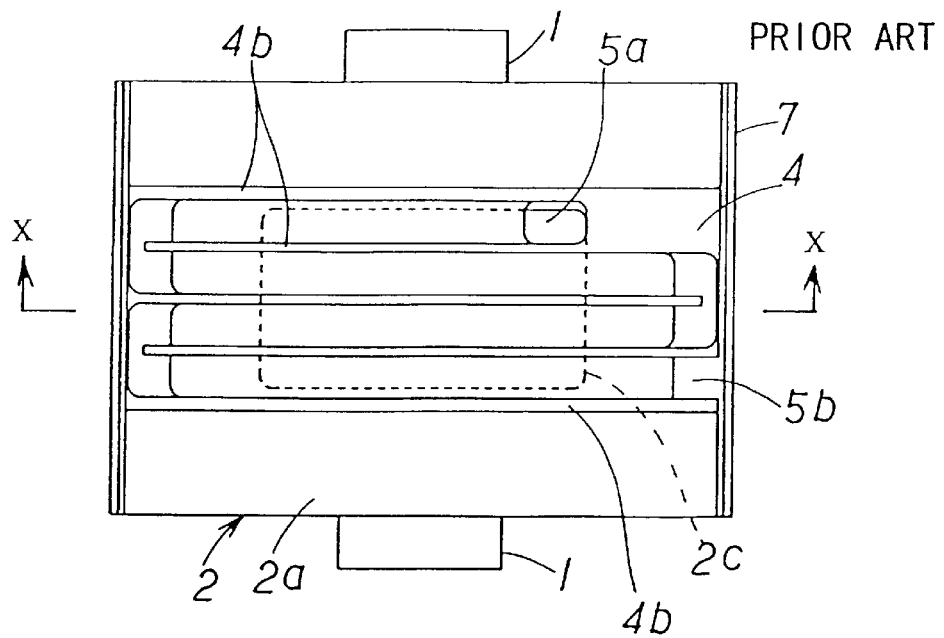
FIG. 12 is a plan view showing a state of a conventional liquid filled vibration isolator in which a portion of an outer cylindrical metal member has been removed.
Figure 13:
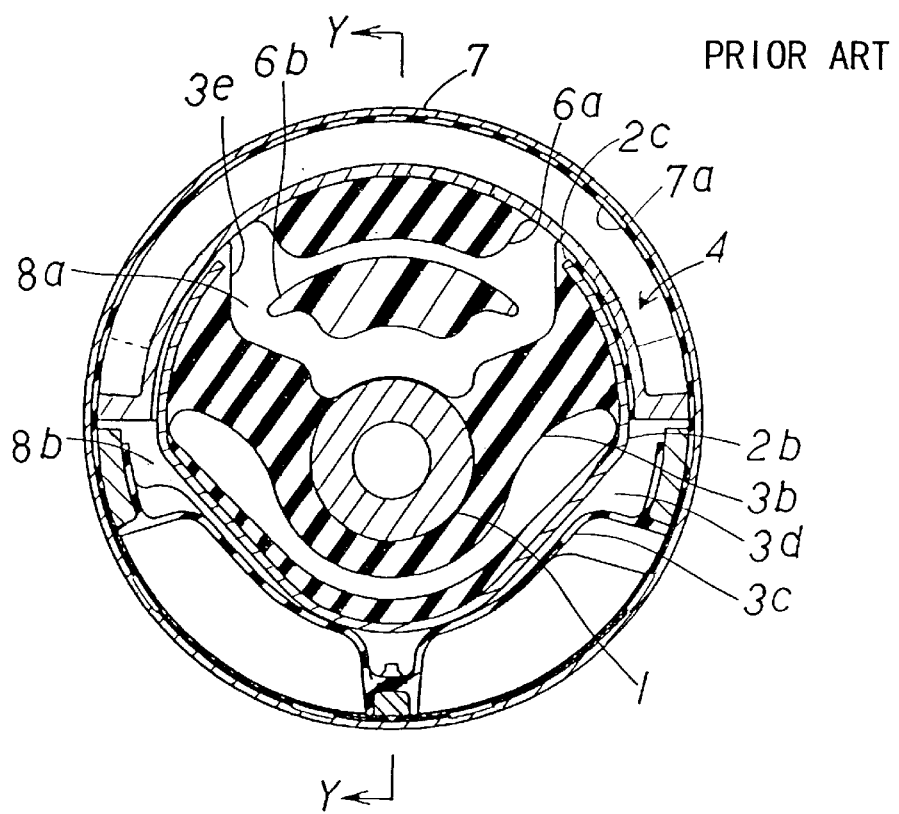
FIG. 13 is a cross sectional view taken along line X—X shown in FIG. 12.
Figure 14:
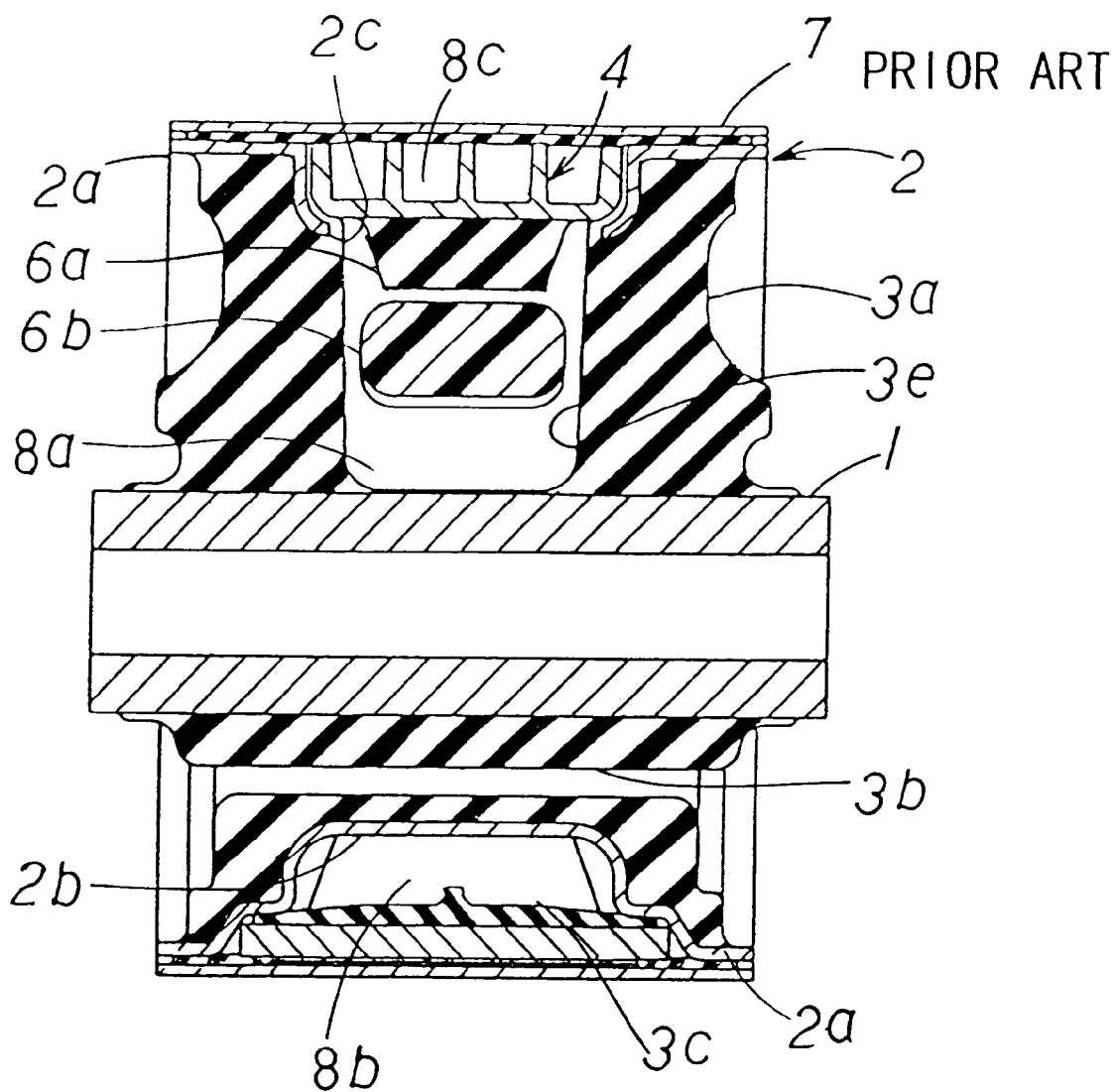
FIG. 14 is a cross sectional view taken along line Y—Y shown in FIG. 13.
Figure 15A:
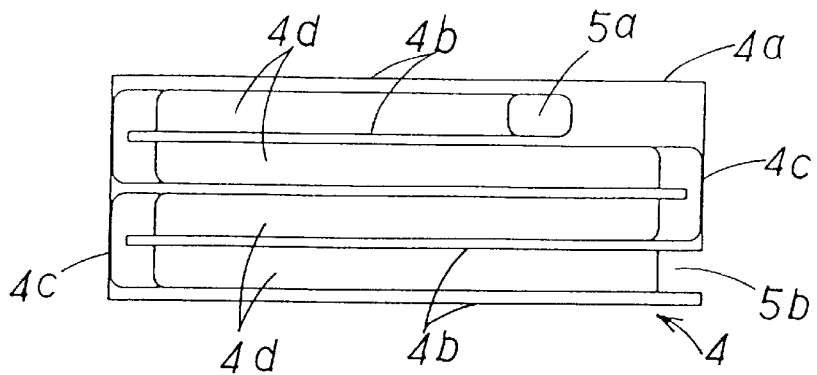
FIG. 15A includes a plan view showing a passage forming member of a conventional liquid filled vibration isolator.
Figure 15B:
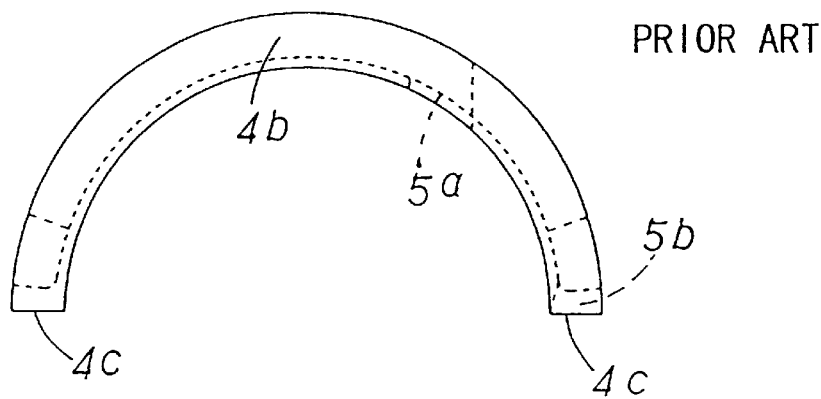
FIG. 15B includes a front view showing the passage forming member of the conventional liquid filled vibration isolator.
Figure 15C:
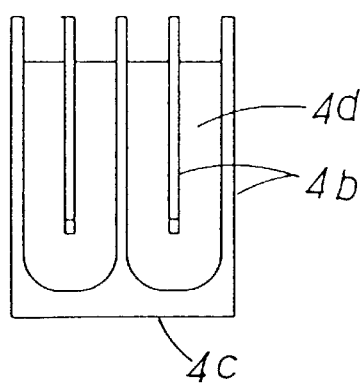
FIG. 15C includes a side view showing the passage forming member of the conventional liquid filled vibration isolator.

As shown in FIG. 11, the modification is configured such that the air discharge openings are formed by providing a projection 65 formed in a reciprocative passage groove 64 of the circular-arc plate 61 except for the partition walls 62. The projection 65 projects outwardly in the radial direction in a predetermined region. Moreover, an air discharge opening 66 for penetrating the projection 65 in the radial direction is provided for the projection 65. Also, the above-mentioned configuration produces the effect of the air discharge openings similar to the foregoing embodiment. As for the width of the passage being narrowed by the projection 65, the passage forming recess 24 is provided for the intermediate member 20 at a position opposite to the air discharge opening 66 similarly to the foregoing embodiment. Therefore, an appropriate width of the passage can be maintained. Therefore, the passage forming member 60 also attains an effect similar to that obtainable from the passage forming member 40 of the previously described embodiment.

In the foregoing embodiment, the large-width portion 42a is provided for the partition walls 42 and the air discharge opening 47 is provided for the large-width portion 42a. However the large-width portion and the air discharging opening may be omitted. Thus, the weight and cost of the passage forming member can be reduced. Similarly, the projection according to the modification may be omitted.

Note that the liquid filled vibration isolator according to the embodiment is an example. Therefore, a variety of modification may be permitted within the scope of the present invention.

What is claimed is:

1. A liquid filled vibration isolator comprising:
   an inner cylindrical metal member;
   a cylindrical intermediate metal member disposed on an outside of said inner cylindrical metal member at a position spaced apart from said inner cylindrical metal member, said cylindrical intermediate metal member including:
      a pair of ring portions formed at two ends of said cylindrical intermediate metal member in an axial direction,
      a connection portion for integrally connecting said pair of ring portions to each other, and
      an opening formed in a part of said connection portion in a direction in which main vibrations are input into said liquid filled vibration isolator;
   a rubber member including a pair of side wall portions for connecting said pair of ring portions of said cylindrical intermediate metal member and said inner cylindrical metal member to each other;
   an arm portion for connecting said pair of side wall portions in said axial direction to connect said connection portion and said inner cylindrical metal member;
   a recess surrounded by said pair of side wall portions and said arm portion and opened in said opening;
   a thin diaphragm portion disposed opposite to said opening in a radial direction such that said thin diaphragm portion is disposed so as to be spaced apart from said inner cylindrical metal member and said arm portion at a position between said pair of ring portions of said cylindrical intermediate metal member;
   a rubber sealing portion disposed on an outer surface of said cylindrical intermediate metal member;
   a passage forming member including:
      a circular-arc plate disposed on an outside of said connection portion and extending in a circumferential direction to close said opening,
      a reciprocative passage groove formed in an outer surface of said circular-arc plate to reciprocate in a circumferential direction between first and second ends of said circular-arc plate,
      a first communication opening which communicates with said recess at a first end of said reciprocative passage groove, and
      a second communication opening opened in said circumferential direction at a second end of said reciprocative passage groove; and
   an outer cylindrical metal member secured to an outside portion of said cylindrical intermediate metal member and said passage forming member, said outer cylindrical metal member being arranged to cause said rubber sealing portion to close a space within said cylindrical intermediate metal member in a liquid-tight manner to form a main liquid chamber in said recess and a sub-liquid-chamber defined by said thin diaphragm portion, and said outer cylindrical metal member being capable of forming an orifice passage in a space within said passage forming member to allow said main liquid chamber and said sub-liquid chamber to communicate with each other, wherein said reciprocative passage groove is formed in said orifice passage and defined by at least one partition wall extending from either of said first and second ends of said circular-arc plate, said first and second ends being located in the circumferential direction, said at least one partition wall being located inwardly from both lateral sides of said circular-arc plate in a widthwise direction such that if said at least one partition wall comprises more than one partition wall, all of said partition walls are located inwardly from said lateral sides of said circular-arc plate, and said first and second ends of said circular-arc plate in said circumferential direction having end walls extending outwardly in said radial direction.

2. The liquid filled vibration isolator according to claim 1, further comprising an air discharging opening which penetrates said at least one partition wall in said radial direction so as to be allowed to communicate with said recess, said air discharging opening being provided for a portion of said at least one partition wall.

3. The liquid filled vibration isolator according to claim 1, further comprising an air discharging opening and a projection, wherein said projection projects outwardly in said radial direction for a portion of said reciprocative passage groove, and said air discharging opening penetrates said projection in said radial direction and communicates with said recess.

4. The liquid filled vibration isolator according to claim 2 or 3, further comprising a passage forming recess communicating with said reciprocative passage groove for a portion of said cylindrical intermediate metal member opposite to said air discharging opening in said axial direction.

5. A liquid filled vibration isolator comprising:
an inner cylindrical metal member;
a cylindrical intermediate metal member disposed on an outside of said inner cylindrical metal member at a position spaced apart from said inner cylindrical metal member, said cylindrical intermediate metal member including:
  a pair of ring portions formed at two ends of said cylindrical intermediate metal member in an axial direction,
  a connection portion for integrally connecting said pair of ring portions to each other, and
  an opening formed in a part of said connection portion in a direction in which main vibrations are input into said liquid filled vibration isolator;
a rubber member including a pair of side wall portions for connecting said pair of ring portions of said cylindrical intermediate metal member and said inner cylindrical metal member to each other;
an arm portion for connecting said pair of side wall portions in said axial direction to connect said connection portion and said inner cylindrical metal member;
a recess surrounded by said pair of side wall portions and said arm portion and opened in said opening;
a thin diaphragm portion disposed opposite to said opening in a radial direction such that said thin diaphragm portion is disposed so as to be spaced apart from said inner cylindrical metal member and said arm portion at a position between said pair of ring portions of said cylindrical intermediate metal member;
a rubber sealing portion disposed on an outer surface of said cylindrical intermediate metal member;
a passage forming member including:
  a circular-arc plate disposed on an outside of said connection portion and extending in a circumferential direction to close said opening,
  a reciprocative passage groove formed in an outer surface of said circular-arc plate to reciprocate in a circumferential direction between first and second ends of said circular-arc plate,
  a first communication opening which communicates with said recess at a first end of said reciprocative passage groove, and
  a second communication opening opened in said circumferential direction at a second end of said reciprocative passage groove; and
an outer cylindrical metal member secured to an outside portion of said cylindrical intermediate metal member and said passage forming member, said outer cylindrical metal member being arranged to cause said rubber sealing portion to close a space within said cylindrical intermediate metal member in a liquid-tight manner to form a main liquid chamber in said recess and a sub-liquid-chamber defined by said thin diaphragm portion, and said outer cylindrical metal member being capable of forming an orifice passage in a space within said passage forming member to allow said main liquid chamber and said sub-liquid chamber to communicate with each other, wherein said reciprocative passage groove is formed in said orifice passage and defined by at least one partition wall extending from either of said first and second ends of said circular-arc plate, said first and second ends being located in the circumferential direction, said at least one partition wall being located inwardly from both lateral sides of said circular-arc plate in a widthwise direction, and said first and second ends of said circular-arc plate in said circumferential direction having end walls extending outwardly in said radial direction, wherein transverse outer edges of said circular-arc plate do not extend as far outwardly in said radial direction as do said at least one partition wall.

6. The liquid filled vibration isolator according to claim 5, further comprising an air discharging opening which penetrates said at least one partition wall in said radial direction so as to be allowed to communicate with said recess, said air discharging opening being provided for a portion of said at least one partition wall.

7. The liquid filled vibration isolator according to claim 5, further comprising an air discharging opening and a projection, wherein said projection projects outwardly in said radial direction for a portion of said reciprocative passage groove, and said air discharging opening penetrates said projection in said radial direction and communicates with said recess.

8. The liquid filled vibration isolator according to either claim 6 or claim 7, further comprising a passage forming recess communicating with said reciprocative passage groove for a portion of said cylindrical intermediate metal member opposite to said air discharging opening in said axial direction.

9. A liquid filled vibration isolator comprising:
an inner cylindrical metal member;
a cylindrical intermediate metal member disposed on an outside of said inner cylindrical metal member at a position spaced apart from said inner cylindrical metal member, said cylindrical intermediate metal member including:
  a pair of ring portions formed at two ends of said cylindrical intermediate metal member in an axial direction,
  a connection portion for integrally connecting said pair of ring portions to each other, and
  an opening formed in a part of said connection portion in a direction in which main vibrations are input into said liquid filled vibration isolator;
a rubber member including a pair of side wall portions for connecting said pair of ring portions of said cylindrical intermediate metal member and said inner cylindrical metal member to each other;
an arm portion for connecting said pair of side wall portions in said axial direction to connect said connection portion and said inner cylindrical metal member;
a recess surrounded by said pair of side wall portions and said arm portion and opened in said opening;
a thin diaphragm portion disposed opposite to said opening in a radial direction such that said thin diaphragm portion is disposed so as to be spaced apart from said inner cylindrical metal member and said arm portion at a position between said pair of ring portions of said cylindrical intermediate metal member;

a rubber sealing portion disposed on an outer surface of said cylindrical intermediate metal member;

a passage forming member including:
   a circular-arc plate disposed on an outside of said connection portion and extending in a circumferential direction to close said opening,
   a reciprocative passage groove formed in an outer surface of said circular-arc plate to reciprocate in a circumferential direction between first and second ends of said circular-arc plate,
   a first communication opening which communicates with said recess at a first end of said reciprocative passage groove, and
   a second communication opening opened in said circumferential direction at a second end of said reciprocative passage groove; and an outer cylindrical metal member secured to an outside portion of said cylindrical intermediate metal member and said passage forming member, said outer cylindrical metal member being arranged to cause said rubber sealing portion to close a space within said cylindrical intermediate metal member in a liquid-tight manner to form a main liquid chamber in said recess and a sub-liquid-chamber defined by said thin diaphragm portion, and said outer cylindrical metal member being capable of forming an orifice passage in a space within said passage forming member to allow said main liquid chamber and said sub-liquid chamber to communicate with each other, wherein said reciprocative passage groove is formed in said orifice passage and defined by at least one partition wall extending from either of said first and second ends of said circular-arc plate, said first and second ends being located in the circumferential direction, said at least one partition wall being located inwardly from both lateral sides of said circular-arc plate in a widthwise direction, and said first and second ends of said circular-arc plate in said circumferential direction having end walls extending outwardly in said radial direction; and an air discharging opening which penetrates said at least one partition wall in said radial direction so as to be allowed to communicate with said recess, said air discharging opening being provided for a portion of said at least one partition wall.

10. The liquid filled vibration isolator according to claim 9, further comprising an air discharging opening and a projection, wherein said projection projects outwardly in said radial direction for a portion of said reciprocative passage groove, and said air discharging opening penetrates said projection in said radial direction and communicates with said recess.

11. The liquid filled vibration isolator according to either claim 9 or claim 10, further comprising a passage forming recess communicating with said reciprocative passage groove for a portion of said cylindrical intermediate metal member opposite to said air discharging opening in said axial direction.

12. A liquid filled vibration isolator comprising:

an inner cylindrical metal member;

a cylindrical intermediate metal member disposed on an outside of said inner cylindrical metal member at a position spaced apart from said inner cylindrical metal member, said cylindrical intermediate metal member including:

a pair of ring portions formed at two ends of said cylindrical intermediate metal member in an axial direction,
   a connection portion for integrally connecting said pair of ring portions to each other, and
   an opening formed in a part of said connection portion in a direction in which main vibrations are input into said liquid filled vibration isolator;

a rubber member including a pair of side wall portions for connecting said pair of ring portions of said cylindrical intermediate metal member and said inner cylindrical metal member to each other;

an arm portion for connecting said pair of side wall portions in said axial direction to connect said connection portion and said inner cylindrical metal member;

a recess surrounded by said pair of side wall portions and said arm portion and opened in said opening;

a thin diaphragm portion disposed opposite to said opening in a radial direction such that said thin diaphragm portion is disposed so as to be spaced apart from said inner cylindrical metal member and said arm portion at a position between said pair of ring portions of said cylindrical intermediate metal member;

a rubber sealing portion disposed on an outer surface of said cylindrical intermediate metal member;

a passage forming member including:
   a circular-arc plate disposed on an outside of said connection portion and extending in a circumferential direction to close said opening,
   a reciprocative passage groove formed in an outer surface of said circular-arc plate to reciprocate in a circumferential direction between first and second ends of said circular-arc plate,
   a first communication opening which communicates with said recess at a first end of said reciprocative passage groove, and
   a second communication opening opened in said circumferential direction at a second end of said reciprocative passage groove; and an outer cylindrical metal member secured to an outside portion of said cylindrical intermediate metal member and said passage forming member, said outer cylindrical metal member being arranged to cause said rubber sealing portion to close a space within said cylindrical intermediate metal member in a liquid-tight manner to form a main liquid chamber in said recess and a sub-liquid-chamber defined by said thin diaphragm portion, and said outer cylindrical metal member being capable of forming an orifice passage in a space within said passage forming member to allow said main liquid chamber and said sub-liquid chamber to communicate with each other, wherein said reciprocative passage groove is formed in said orifice passage and defined by at least one partition wall extending from either of said first and second ends of said circular-arc plate, said first and second ends being located in the circumferential direction, said at least one partition wall being located inwardly from both lateral sides of said circular-arc plate in a widthwise direction, and said first and second ends of said circular-arc plate in said circumferential direction having end walls extending outwardly in said radial direction; and an air discharging opening and a projection, wherein said projection projects outwardly in said radial direction for a portion of said reciprocative passage groove, and said air discharging opening penetrates said projection in said radial direction and communicates with said recess.

13. The liquid filled vibration isolation according to claim 12, wherein said air discharging opening which penetrates said at least one partition wall in said radial direction so as to be allowed to communicate with said recess, said air discharging opening being provided for a portion of said at least one partition wall.

14. The liquid filled vibration isolator according to either claim 12 or claim 13, further comprising a passage forming recess communicating with said reciprocative passage groove for a portion of said cylindrical intermediate metal member opposite to said air discharging opening in said axial direction.

15. A liquid filled vibration isolator comprising:
an inner cylindrical metal member;
a cylindrical intermediate metal member disposed on an outside of said inner cylindrical metal member at a position spaced apart from said inner cylindrical metal member, said cylindrical intermediate metal member including:
  a pair of ring portions formed at two ends of said cylindrical intermediate metal member in an axial direction,
  a connection portion for integrally connecting said pair of ring portions to each other, and
  an opening formed in a part of said connection portion in a direction in which main vibrations are input into said liquid filled vibration isolator;
a rubber member including a pair of side wall portions for connecting said pair of ring portions of said cylindrical intermediate metal member and said inner cylindrical metal member to each other;
an arm portion for connecting said pair of side wall portions in said axial direction to connect said connection portion and said inner cylindrical metal member;
a recess surrounded by said pair of side wall portions and said arm portion and opened in said opening;
a thin diaphragm portion disposed opposite to said opening in a radial direction such that said thin diaphragm portion is disposed so as to be spaced apart from said inner cylindrical metal member and said arm portion at a position between said pair of ring portions of said cylindrical intermediate metal member;
a rubber sealing portion disposed on an outer surface of said cylindrical intermediate metal member;
a passage forming member including:
  a circular-arc plate disposed on an outside of said connection portion and extending in a circumferential direction to close said opening,
  a reciprocative passage groove formed in an outer surface of said circular-arc plate to reciprocate in a circumferential direction between first and second ends of said circular-arc plate,
  a first communication opening which communicates with said recess at a first end of said reciprocative passage groove, and
  a second communication opening opened in said circumferential direction at a second end of said reciprocative passage groove; and
an outer cylindrical metal member secured to an outside portion of said cylindrical intermediate metal member and said passage forming member, said outer cylindrical metal member being arranged to cause said rubber sealing portion to close a space within said cylindrical intermediate metal member in a liquid-tight manner to form a main liquid chamber in said recess and a sub-liquid-chamber defined by said thin diaphragm portion, and said outer cylindrical metal member being capable of forming an orifice passage in a space within said passage forming member to allow said main liquid chamber and said sub-liquid chamber to communicate with each other, wherein said reciprocative passage groove is formed in said orifice passage and defined by at least one partition wall extending from either of said first and second ends of said circular-arc plate, said first and second ends being located in the circumferential direction, said at least one partition wall being located inwardly from both lateral sides of said circular-arc plate in a widthwise direction, and said first and second ends of said circular-arc plate in said circumferential direction having end walls extending outwardly in said radial direction; and
a passage forming recess communicating with said reciprocative passage groove for a portion of said cylindrical intermediate metal member opposite to said air discharging opening in said axial direction.

16. The liquid filled vibration isolation according to claim 15, further comprising an air discharging opening which penetrates said at least one partition wall in said radial direction so as to be allowed to communicate with said recess, said air discharging opening being provided for a portion of said at least one partition wall.

17. The liquid filled vibration isolation according to claim 15, further comprising an air discharging opening and a projection, wherein said projection projects outwardly in said radial direction for a portion of said reciprocative passage groove, and said air discharging opening penetrates said projection in said radial direction and communicates with said recess.

* * * * *